United States Patent [19]

Chapman et al.

[11] Patent Number: 5,295,065
[45] Date of Patent: Mar. 15, 1994

[54] RESOURCE-LOT ASSOCIATION COORDINATOR

[75] Inventors: William Chapman, Scottsdale; DiAnn Fox, Gilbert; Christopher Handorf, Mesa, all of Ariz.

[73] Assignee: Motorola, Inc., Schaumburg, Ill.

[21] Appl. No.: 531,818

[22] Filed: Jun. 1, 1990

[51] Int. Cl.$^5$ .................... G06F 15/22; G06F 15/46
[52] U.S. Cl. .................... 364/401; 364/468
[58] Field of Search ............ 364/401, 468, 156, 403, 364/408

[56] References Cited

U.S. PATENT DOCUMENTS

| | | | |
|---|---|---|---|
| 4,606,002 | 8/1986 | Waisman et al. | 395/600 |
| 4,937,743 | 6/1990 | Rassman et al. | 364/401 |
| 4,945,475 | 7/1990 | Bruffey et al. | 364/200 |
| 5,093,794 | 3/1992 | Howie et al. | 364/468 |

*Primary Examiner*—Roy N. Envall, Jr.
*Assistant Examiner*—Xuong Chung
*Attorney, Agent, or Firm*—Michael A. Waters; Robert M. Handy

[57] ABSTRACT

An apparatus which efficiently coordinates the association of resource and lot data in a manufacturing environment is disclosed. The apparatus includes a memory structure which associates resource and lot data only with other resource and lot data from a common dependency. A dependency is a characteristic of lots which share common resources and of resources which are shared by common lots. The memory includes nodes which describe the dependencies. The dependency nodes link to resource lists and to lot lists. The resource and lot nodes are part of resource and lot lists, respectively. Usage nodes are included to describe every use each lot makes of each resource. The usage nodes are linked to both resource nodes and lot nodes. The usage nodes are also linked together to define the order in which each lot uses its resources and the order in which each resource is used by its lots. A processor couples to the memory and receives externally-originated messages commanding various operations on the memory structure. In one operation a single dependency may be broken into several dependencies. In another operation multiple dependencies may be combined into a single dependency. The accurate maintenance of the maximum number of dependencies in resource-lot association data allows manufacturing environment simulation and other automation to respond to a manufacturing event by processing only information related to a portion of the environment. Thus, processing time decreases, and simulations may take place in real time.

41 Claims, 9 Drawing Sheets

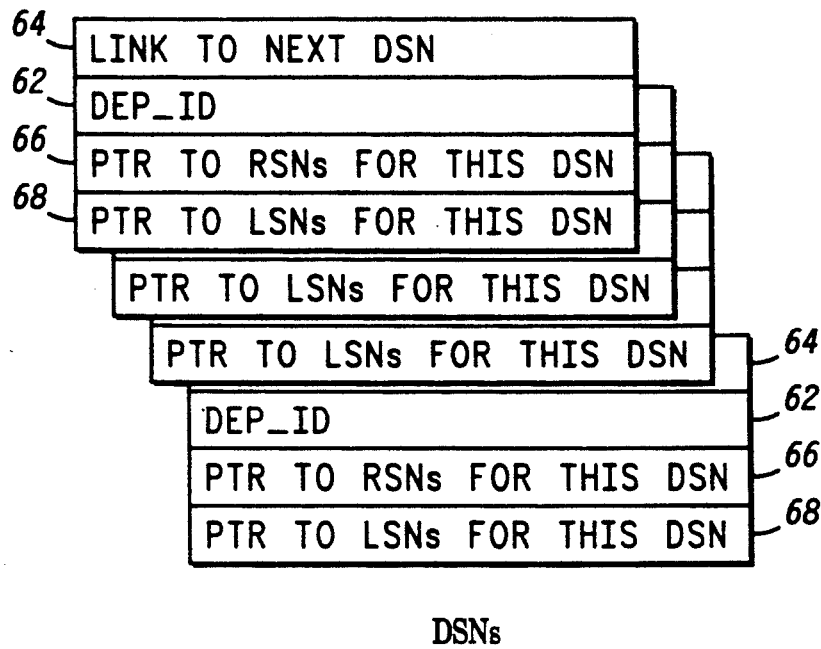
DSNs
FIG. 4
FIG. 5
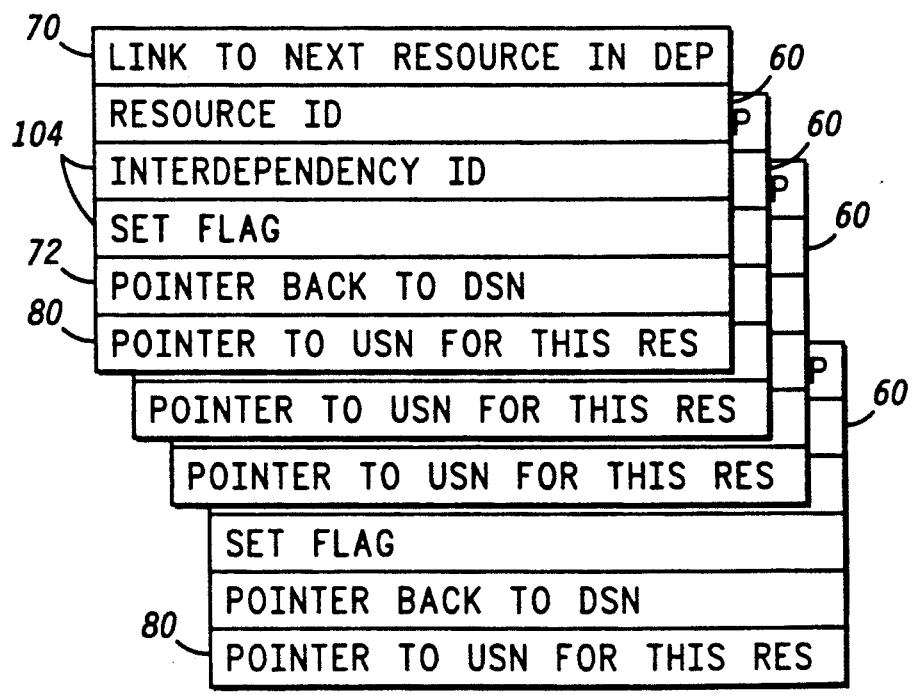
RSNs

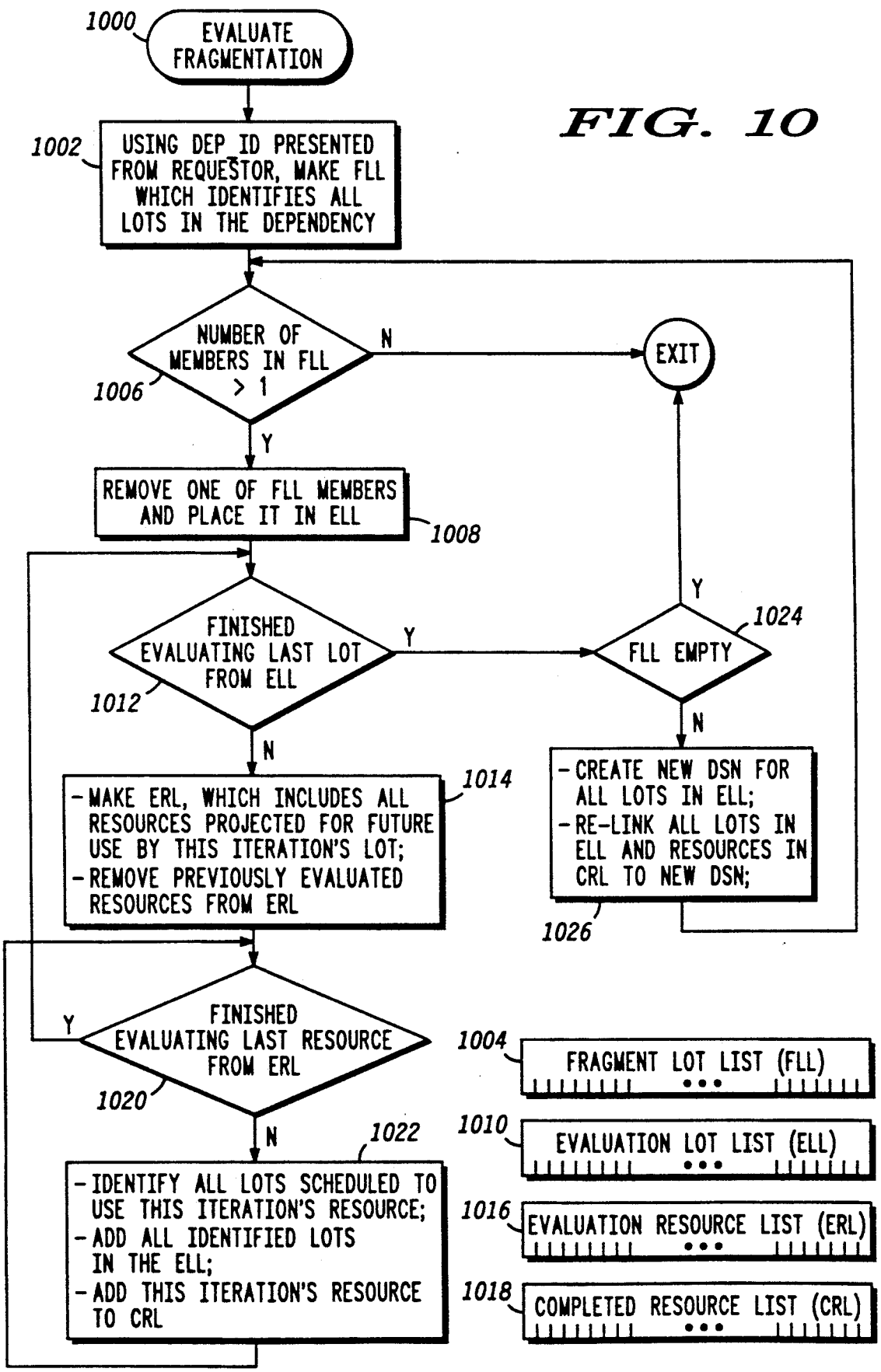

RESOURCE-LOT ASSOCIATION COORDINATOR

RELATED INVENTIONS

The present invention is related to the following, all of which are assigned to the assignee of the present invention:

1. U.S. Pat. No. 5,128,860, filed Apr. 25, 1989, entitled "Means and Method for Managing Manufacturing or Other Resources," by William M. Chapman.
2. Co-pending U.S. patent application Ser. No. 531,821, entitled "Method of Controlling the Execution of Organizational Plans," filed on even date herewith, by William M. Chapman, et al.
3. Co-pending U.S. patent application Ser. No. 531,969, entitled "Manufacturing Control and Capacity Planning System,38 filed on even date herewith, by William M. Chapman. 4. Co-pending U.S. patent application Ser. No. 531,310, entitled "Process Flow Information Management System" filed on even date herewith, by William M. Chapman, et al. 5. Co-pending U.S. patent application Ser. No. 531,306, entitled "Method of Planning Organizational Activities", filed on even date herewith, by William M. Chapman, et al.

Each of the above-listed applications is incorporated herein by reference.

BACKGROUND OF THE INVENTION

1. Technical Field

The present invention relates generally to manufacturing or other organizational activities in which a multiplicity of tasks are simultaneously balanced against one another to achieve goals of the organization. More specifically, the present invention relates to an apparatus and method for efficiently coordinating the association and allocation of organizational resources to these multiplicity of tasks.

2 Background Art

Organizations, such as manufacturers, perform tasks to achieve organizational goals. In performing tasks, resources are used. For simplicity, a task may be viewed as relating to one of a manufacturer's product lots, and resources may be viewed as valuable commodities, such as raw materials, components, equipment, expendable supplies, computer time, labor, and the like. In general, organization management applies resources to product lots to manufacture finished products.

As organizational complexity increases, management faces a vast number of complicated choices concerning how best to allocate scarce resources to competing lots. Moreover, since a manufacturing environment continually changes, any "best" allocation scheme is valid for only an instant in time. An optimized allocation scheme must change in real time to respond to the changing manufacturing environment. The above-listed "Related Inventions" provide various tools which aid the formation of allocation schemes that best meet overall organization goals.

Whether explicitly or not, an organization assigns or otherwise associates its resources with its product lots. Associations occur whenever resources are actually being expended upon or allocated to a lot. Associations also occur in connection with planning, scheduling and simulating anticipated tasks. These anticipated-task associations generally depict projected uses of resources by product lots.

Various reporting and listing tools and techniques are known for associating resource projections with lot projections. For example, conventional Bill-Of-Material lists associate resources required by a product lot with the product lot itself. In addition, conventional scheduling or planning techniques, such as Critical Path Method (CPM), Project Evaluation and Review Technique (PERT), Material Requirements Planning (MRP), and the like, often associate resources such as labor and equipment with product lots. While such conventional reporting and listing tools may be computerized, they nevertheless fail to adequately adapt to the generation, in real time, of resource-lot allocation schemes that best meet overall organization goals.

For example, such conventional resource-lot association techniques are typically not comprehensive enough in scope to supply the informational needs of a resource-lot allocation scheme that encompasses an entire organization's resources and product lots. Often, such techniques encompass only a small portion of an entire organization's resources and product lots. Such incomprehensive techniques are useless for a resource-lot allocation scheme that aims to optimize allocations for an entire organization because they fail to provide resource-lot associations for the entire organization.

Conventional techniques additionally fail to include attributes and precise timing information for a lot's specific uses of resources. For example, a product lot may require the use of an oven resource. Attributes of the oven may describe the oven's temperature and the amount of oven space available for use by the product lot. Timing information describes a projected point in time when the lot initially requires the oven and the duration over which the oven is required. This type of attribute and timing information is useful in optimizing resource-lot allocations because, for example, it provides knowledge for scheduling the simultaneous sharing of a resource, such as the oven, by multiple lots. In addition, such attribute and timing information provides baseline conditions used in simulating the manufacturing environment.

While conventional computerized resource-lot association reporting and listing techniques might possibly be expanded to encompass an entire organization's resources and lots and to include attributes and timing information, such a simple expansion would present serious problems for an organization which has thousands of resources to apply to hundreds of lots. A tremendous amount of computer memory would be required to adequately characterize all potential combinations of resource-lot associations. In addition, a tremendous amount of computer processing capability would be required to continually process the data contained in this tremendous amount of memory, as required by real-time simulation and real time tracking of actual and planned events in the manufacturing environment. Even with current advancements in computer technology, such tremendous memory and processing requirements would render a simple expansion of conventional resource-lot association techniques too expensive and too unreliable for even the largest of manufacturing organizations.

SUMMARY OF THE INVENTION

Accordingly, it is an advantage of the present invention that an apparatus and method which efficiently coordinates the association of resources and lots is provided.

Another advantage is that the present invention characterizes data describing resource-lot associations in a manner which limits the quantity of data that must be processed by a real time, organization-wide, resource-lot allocation scheme.

Yet another advantage is that the present invention provides a memory structure which permits rapid access to specific resource-lot association data.

Still another advantage is that the present invention provides a structure which retains comprehensive, organization-wide, resource-lot association data in a relatively small amount of memory space.

Another advantage is that the present invention includes a controlling agent for continually maintaining resource-lot association data in a current state.

The above-listed and other advantages of the present invention are carried out in one form by an improved memory apparatus for efficiently coordinating the association of resources with lots. The apparatus includes first and second dependency-structure nodes (DSNs). Data identifying the ones of the lots and resources which share a first common dependency are stored in the first DSN. Data identifying the ones of the lots and resources which share a second common dependency are stored in the second DSN. The first and second DSNs do not share any common lot-identifying or resource-identifying data. One of the first and second DSNs includes a pointer which identifies the other of the first and second DSNs.

The present invention is described herein using a set of related concepts. Accordingly, TABLE I, presented below, provides a glossary of terms and phrases which are used in describing the present invention. For purposes of the present invention, the normal usage of these terms and phrases are to be augmented by the definitions listed in TABLE I.

TABLE I

Plan -- a scheme or program identifying future processes to be performed on a lot in order to accomplish external goals. The processes specify the use of various resources in operating on the lot. The plan is expressed as an ordered collection of data retained in a media, such as a computer memory, from which it can be later accessed and transferred.
Process -- one step in a plan. A process identifies an activity or group of activities which are performed on a lot. A lot may wait during a process before the activity is actually performed. While waiting, a resource or many resources may be consumed, an event which denotes an initial use of the resource. After completion of the activity, previously consumed resources may be released, an event which denotes the final use of the resource.
Lot -- generally a tangible item or group of like tangible items toward which a plan's goal is directed. When a lot includes multiple items, all items of the lot are generally processed or operated upon as a unit. For example, a lot may be considered as a product, portion of a product, or other work in process within a manufacturing environment. In addition, a lot may be a dummy, phantom, or otherwise intangible logical need. Thus, an intangible lot may be scheduled to utilize a resource so that the resource's maintenance needs can be met.
Resource -- a valuable commodity used or partially used in accomplishing plan goals for a lot. A resource may be a service, such as human labor, or a tangible item, such as tools, equipment, transportation systems, and raw materials. In addition, a dummy, phantom, or otherwise intangible resource may be created with attributes that affect a lot parameter. For example, an intangible resource may be created with a capacity for processing a maximum quantity of product. Thus, such a resource can operate to limit maximum lot size in the manufacturing environment.
Attributes -- parameters which define a specific TABLE I-continued configuration for a resource. For example, an attribute of an oven may be temperature, and an attribute of a mixer may be a speed at which the mixer operates. If two lots require different attributes for an otherwise sharable resource, the sharable resource may not be shared by the two lots.
Static Resource -- a resource which is allocated to lots in a priority order without regard for whether the resource and lower priority lots remain idle while a higher priority lot completes a prior process or waits in a static wait queue for additional resources to become available. The commitment of a static resource to a lot prevents competing lots from having access to the resource. Raw materials and equipment are typically, although not necessarily, classified as static resources.
Dynamic Resource -- a resource which is allocated to any waiting lot when the resource becomes available. When more than one lot is waiting, a priority order determines to which lot the dynamic resource is assigned. In allocating a dynamic resource, a higher priority lot will wait for a lower priority lot to finish with the resource when: 1) the lower priority lot is waiting on the dynamic resource as the dynamic resource becomes available, and 2) the higher priority lot is not yet ready to use the dynamic resource when the dynamic resource becomes available. Labor is typically, although not necessarily, considered to be a dynamic resource.
Queue -- a sub-component of a process. In order for a lot to undergo a process, it must traverse at least one activity queue. In addition, it may traverse through a static wait queue and/or a dynamic wait queue.
Static Wait Queue -- a simulated queue where a lot waits for the availability of a dynamic resource. While waiting, no activity is performed with or on the lot. Dynamic resources are consumed during dynamic wait queues. The queue ends when all dynamic resources consumed in the queue become available.
Static Wait Queue -- a simulated queue where a lot waits for the availability of a static resource. While waiting, no activity is performed with or on the lot. Static resources are consumed during static wait queues. The queue ends when all static resources consumed in the queue become available.
Activity Queue -- a simulated queue where a resource actually performs a service for, an activity with, or operates upon a lot. A resource is released at the end of an activity queue, when all activities requiring the resource have been performed.
Dependency -- a relationship which exists between various lots and resources. Lots which have a demand for a common resource share a single dependency with each other and the common resource. Likewise, two resources, each of which are demanded by a common lot, share a single dependency with one another and the common lot. Furthermore, lots and resources may indirectly share a dependency through other resources and lots, respectively. Generally speaking, as a given number of lots and resources become more dependent upon one another, the number of dependencies decreases. However, static and dynamic resources are defined so that they do not share a dependency through any common lots which may demand both resources.

as a computer memory, from which it can be later accessed and transferred.

Process -- one step in a plan. A process identifies an activity or group of activities which are performed on a lot. A lot may wait during a process before the activity is actually performed. While waiting, a resource or many resources may be consumed, an event which denotes an initial use of the resource. After completion of the activity, previously consumed resources may be released, an event which denotes the final use of the resource.

Lot -- generally a tangible item or group of like tangible items toward which a plan's goal is directed. When a lot includes multiple items, all items of the lot are generally processed or operated upon as a unit. For example, a lot may be considered as a product, portion of a product, or other work in process within a manufacturing environment. In addition, a lot may be a dummy, phantom, or otherwise intangible logical need. Thus, an intangible lot may be scheduled to utilize a resource so that the resource's maintenance needs can be met.

Resource -- a valuable commodity used or partially used in accomplishing plan goals for a lot. A resource may be a service, such as human labor, or a tangible item, such as tools, equipment, transportation systems, and raw materials. In addition, a dummy, phantom, or otherwise intangible resource may be created with attributes that affect a lot parameter. For example, an intangible resource may be created with a capacity for processing a maximum quantity of product. Thus, such a resource can operate to limit maximum lot size in the manufacturing environment.

Attributes -- parameters which define a specific configuration for a resource. For example, an attribute of an oven may be temperature, and an attribute of a mixer may be a speed at which the mixer operates. If two lots require different attributes for an otherwise sharable resource, the sharable resource may not be shared by the two lots.

Static Resource -- a resource which is allocated to lots in a priority order without regard for whether the resource and lower priority lots remain idle while a higher priority lot completes a prior process or waits in a static wait queue for additional resources to become available. The commitment of a static resource to a lot prevents competing lots from having access to the resource. Raw materials and equipment are typically, although not necessarily, classified as static resources.

Dynamic Resource -- a resource which is allocated to any waiting lot when the resource becomes available. When more than one lot is waiting, a priority order determines to which lot the dynamic resource is assigned. In allocating a dynamic resource, a higher priority lot will wait for a lower priority lot to finish with the resource when: 1) the lower priority lot is waiting on the dynamic resource as the dynamic resource becomes available, and 2) the higher priority lot is not yet ready to use the dynamic resource when the dynamic resource becomes available. Labor is typically, although not necessarily, considered to be a dynamic resource.

Queue -- a sub-component of a process. In order for a lot to undergo a process, it must traverse at least one activity queue. In addition, it may traverse through a static wait queue and/or a dynamic wait queue.

Dynamic Wait Queue -- a simulated queue where a lot waits for the availability of a dynamic resource. While waiting, no activity is performed with or on the lot. Dynamic resources are consumed during dynamic wait queues. The queue ends when all dynamic resources consumed in the queue become available.

Static Wait Queue -- a simulated queue where a lot waits for the availability of a static resource. While waiting, no activity is performed with or on the lot. Static resources are consumed during static wait queues. The queue ends when all static resources consumed in the queue become available.

Activity Queue -- a simulated queue where a resource actually performs a service for, an activity with, or operates upon a lot. A resource is released at the end of an activity queue, when all activities requiring the resource have been performed.

Dependency -- a relationship which exists between various lots and resources. Lots which have a demand for a common resource share a single dependency with each other and the common resource. Likewise, two resources, each of which are demanded by a common lot, share a single dependency with one another and the common lot. Furthermore, lots and resources may indirectly share a dependency through other resources and lots, respectively. Generally speaking, as a given number of lots and resources become more dependent upon one another, the number of dependencies decreases. However, static and dynamic resources are defined so that they do not share a dependency through any common lots which may demand both resources.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 4 illustrates exemplary Dependency Structure Nodes (DSNs) included within the memory portion of the coordinator of the present invention;

FIG. 5 illustrates exemplary Resource-Structure Nodes (RSNs) included within the memory portion of the coordinator of the present invention;

FIG. 10 shows a flow chart of tasks performed by an "Evaluate Fragmentation" process of the present invention.

DETAILED DESCRIPTION OF THE PREFERRED EMBODIMENT

Figure 1:
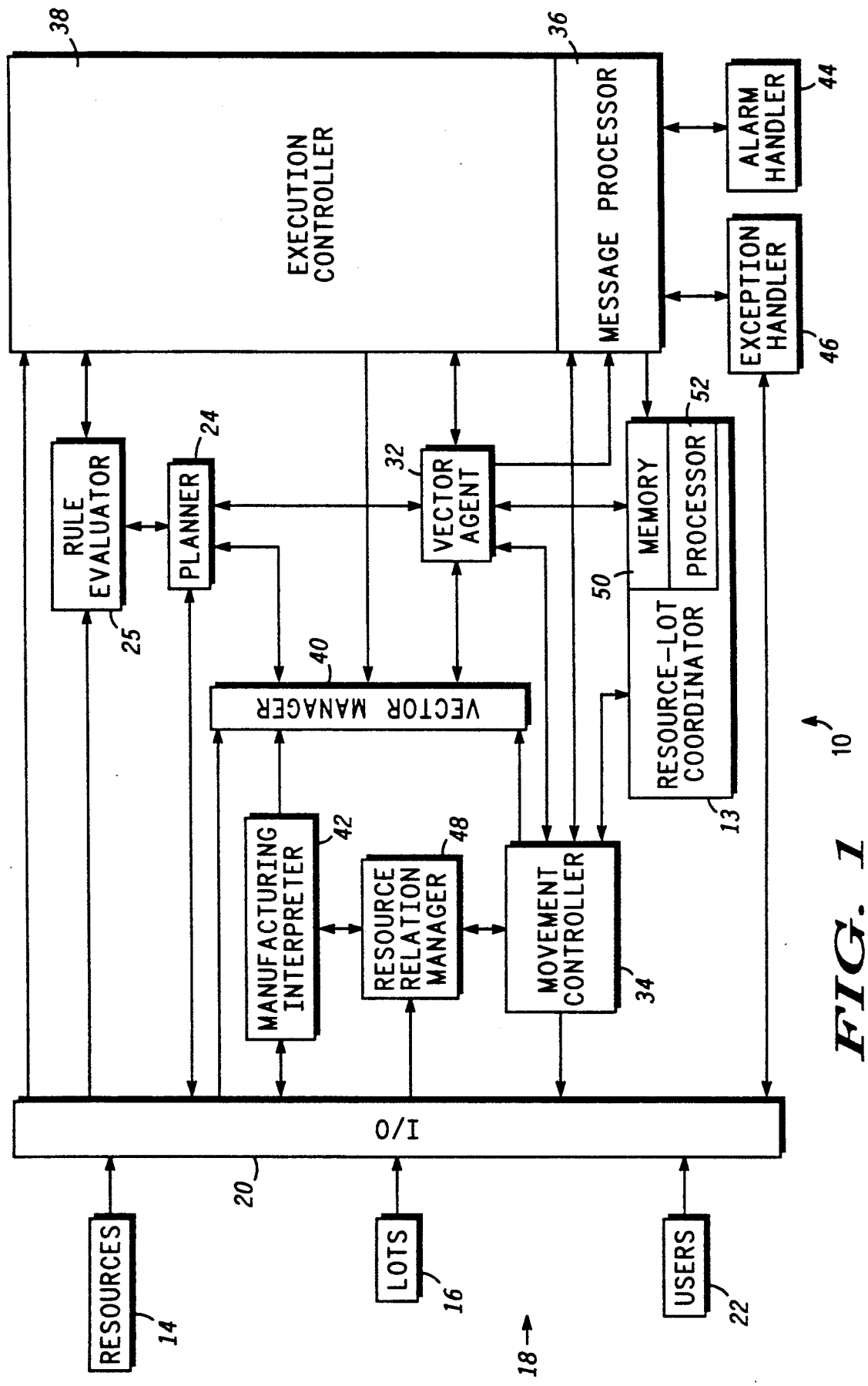
FIGURE 1 shows a block diagram of a manufacturing environment in which the coordinator of the present invention operates.

FIG. 1 shows a block diagram of a manufacturing environment 10 in which a resource-lot coordinator 13, constructed in accordance with the principles of the present invention, operates. Within environment 10, coordinator 13 receives, stores, maintains, and retrieves projected and current associations of resources 14 with lots 16 (see TABLE I, above). The coordination performed by coordinator 13 is a data processing function. In other words, coordinator 13 operates upon data descriptive of various parameters for resources 14, lots 16, and the manner in which resources 14 are allocated to and projected for allocation to lots 16. The present invention contemplates that coordinator 13 can operate in connection with any number of resources 14 and any number of lots 16. However, as a practical matter the benefits obtained from utilizing coordinator 13 are expected to increase as the complexity of environment 10 increases. For example, coordinator 13 is expected to serve an extremely beneficial role when environment 10 includes thousands of resources 14 and hundreds of lots 16.

Coordinator 13 and related components (discussed below) of environment 10 are implemented using conventional computer hardware 18. The present invention is preferably implemented within a conventional distributed computer network, but the present invention also contemplates the use of a single conventional computer for the present invention and related components. Within a distributed computer system, computer 18 may distribute the processing requirements of coordinator 13 away from other components and allow all components to simultaneously operate while communicating with one another through messages. The distribution of processing improves the timeliness of information processing by allowing, for example, coordinator 13 to perform its functions in parallel with the accomplishment of functions performed by other components of computer 18.

An input/output (I/0) section 20 provides conventional devices for interfacing computer 18 to the physical world. Thus, section 20 includes conventional printers, video terminals, light pens, and other information-passing devices. Coordinator 13 may be utilized with section 20 to provide information to human agents or users 22 of environment 10 so that they may cause resources 14 and lots 16 to be processed in accordance with the information. In addition, coordinator 13 may be utilized with section 20 to receive information concerning resources 14 and lots 16 or for use in associating new lots and resources with existing lots 16 and resources 14. Furthermore, I/0 section 20 may include sensors, controllers, robots, and the like, which allow a direct automated interface between coordinator 13 on one side and resources 14 and lots 16 on the other, without the intervention of users 22.

A planner component 24 and a rule evaluator component 25 of environment 10 cooperate to aid an expert user 22 in formulating a plan for manufacturing a lot. Planner component 24 is discussed in more detail in the above-referenced "Method of Planning Organizational Activities" reference. An expert is any person who is familiar with the processes and resources needed to transform a lot 16 into a finished product. For the purposes of the present invention, the plan need not follow any particular guidelines. Thus, any conventional planning technique may be used to specify a schedule for manufacturing a lot 16. Moreover, each manufacturing environment 10 and product will have a unique plan for transforming its lots 16 into finished products.

As is conventional, a plan specifies a series of processes (see TABLE I, above) which must be performed in order to transform a lot 16 into a finished product. In addition, the plan specifies those ones of resources 14 which are needed to carry out the plan and tentative timing data which define when specific processes should take place. At the planning stage, a lot is merely planned and not activated as one of lots 16 in environment 10. In other words, a plan for producing a lot has been made, but no work in progress has been started to accomplish the plan. The plan is formulated in accordance with rules specified by rule evaluator 25 and retained as data within planner 24 or a database (not shown) accessed by planner 24.

Figure 2:
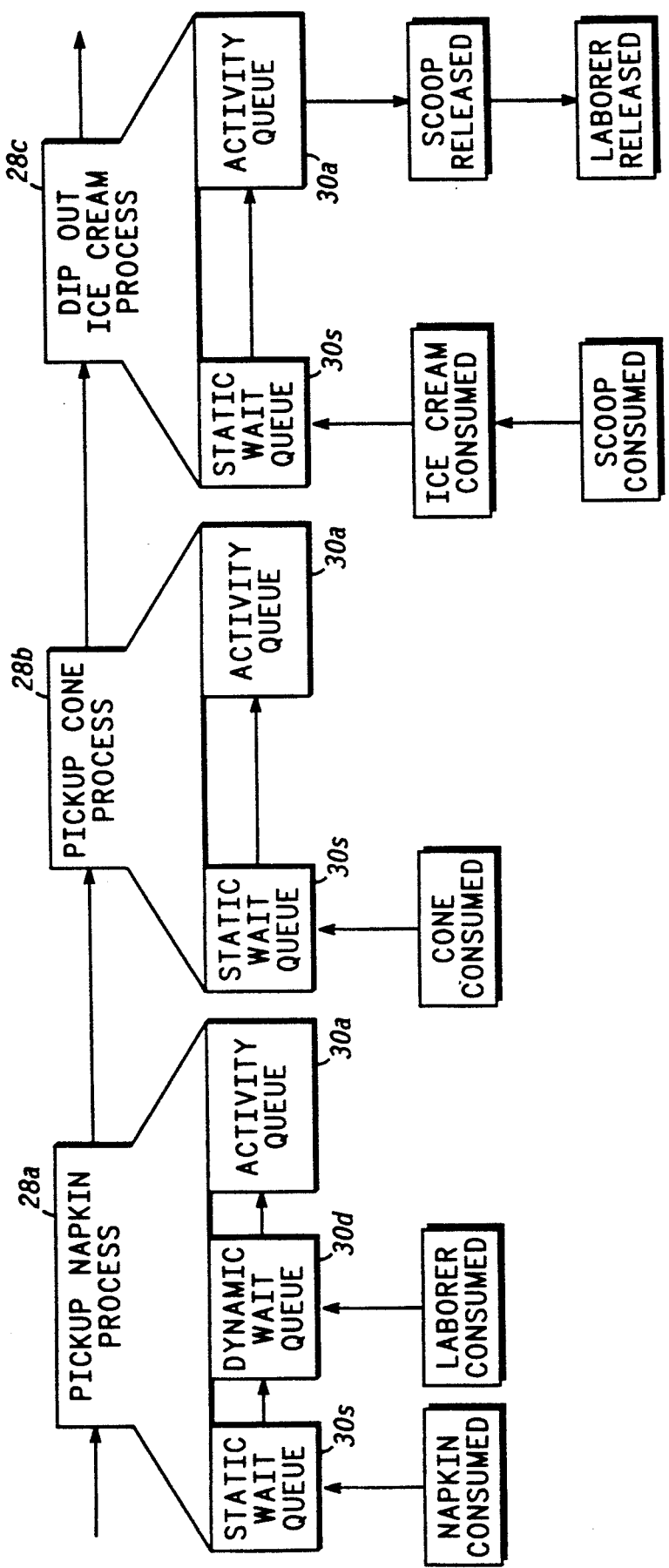
FIG. 2 shows an example manufacturing plan which may supply data upon which the coordinator of the present invention operates.

FIG. 2 shows an example of a manufacturing plan 26. In order to simplify the concepts embodied in the present invention, plan 26 is directed toward the extremely simple task of making an ice cream cone. Of course, the present invention is not dedicated to any particular manufacturing plan or environment, but may be programmed with manufacturing requirements by expert users 22 (see FIG. 1) for a wide variety of jobs, particularly jobs which may be many times more complicated than that shown in FIG. 2. In addition, environment 10 in which the present invention operates may simultaneously incorporate a multiplicity of plans 26 aimed toward achieving different goals in relation to a multiplicity of lots 16 (see FIG. 1).

Plan 26 of FIG. 2 is divided into three processes, referred to as processes 28a-28c. A first process 28a of the FIG. 2 plan calls for picking up a napkin, a second process 28b calls for picking up a cone, and a third process 28c calls for scooping out ice cream and placing the ice cream in the cone. In addition, plan 26 may include tentative timing information (not shown) which depicts when to start processes 28 and how long each process 28 should take. Of course, the present invention places no constraints on the number of processes that a plan may include. These processes and related timing data are defined by an expert user 22 in accordance with the 15 expert user's understanding of the processes needed to produce a finished product.

Plan 26 divides each process 28 into one or more of queues 30. The queues specified for each process are defined by the expert user 22 in accordance with his or her understanding of the processes 28. As shown in FIG. 2, each process 28 contains at least an activity queue 30a, defined above in TABLE I. In addition, each process may include one or more wait queues. In process 28a the expert has included a static wait queue 30s, defined above in TABLE I, followed by a dynamic wait queue 30d, defined above in TABLE I, followed by an activity queue 30a. The expert has included only static wait queues 30s followed by activity queues 30a in processes 28b and 28c. As discussed below, coordinator 13 (see FIG. 1) includes information identifying queues 30 for use in simulating manufacturing environment 10.

Plan 26 relies on classifying each of resources 14 (see FIG. 1) into one of two possible categories. The first category is a "dynamic" resource and the second category is a "static" resource. As defined above in TABLE I, the difference between static and dynamic resources lies in the prioritization methodologies employed in allocating resources 14 to lots 16. Expert users 22 perform this classification task based upon their understanding of their own environments 10. The specific classifications applied to specific resources are not important to the present invention. However, as a result of this permitted dichotomy in resource allocation, coordinator 13 is able to maximize the number of dependencies (see TABLE I) within the data it processes. Consequently, computer 18 may simulate environment 10 in real time, and simulation results tend to realistically reflect environment 10.

Generally speaking, environment 10 uses dynamic resources more efficiently than it uses static resources. In order to use dynamic resources efficiently, some of lots may be processed less expeditiously than would result if the dynamic resources were treated as being static. United States manufacturers typically manage labor users 22 (see FIG. 1) so that they stay busy and do not wait around for lots 16 to become available for their services. As a result of this treatment, work in progress tends to wait on the availability of labor users 22 rather than having labor wait until work in progress becomes available to receive the labor user's services.

Static queues 30s represent periods of time for which a lot must wait for the availability of a static resource, and dynamic queues 30d represent periods of time for which a lot must wait for the availability of a dynamic resource. As shown in connection with process 28a, a dynamic queue 30d is simulated as occurring after a static queue 30a if both types of wait queues are present within a single process 28. This relationship between static and dynamic queues should be chosen most often by the expert because it allows the simulation to treat dynamic resources as a more precious commodity which must be used as efficiently as possible.

As shown in FIG. 2, an expert has classified a napkin as being a static resource for plan 26. Due to this classification, the napkin must be available before a labor user 22 picks up the napkin. Thus, a single napkin is consumed in a static wait queue 30s (see TABLE I). For simulation purposes, that portion of a resource which has been consumed by a lot is treated as being unavailable for allocation to another lot. In other words, the napkin consumed in queue 30s will not later be simulated as being available for another lot. The ice cream cone lot of plan 26 is simulated as remaining in dynamic wait queue 30d until a labor user 22 (see FIG. 1) becomes available. The availability of a dynamic resource, such as a labor user 22, is projected during a simulation of environment 10 by considering other tasks to which the resource may be allocated. The simulation refrains from characterizing the dynamic resource as remaining idle while it waits on a lot to become available when other competing lots are already available. Once the labor user 22 is available, process 28a flows into activity queue 30a, in which the labor user 22 actually picks up the napkin.

In other words, no activity is simulated as occurring in queue 30s. Rather, the lot is simulated as waiting for the availability of a napkin. Likewise, no activity is simulated as occurring in queue 30d. Rather, the lot is simulated as waiting for a labor user 22 to become available to pick up the napkin. Only in activity queue 30a is activity simulated, and that activity is the picking up of the napkin.

Resources may be released at the completion of an activity queue 30a (see TABLE I). However, as shown in activity queue 30a of process 27a, plan 26 is not required to release a resource as the result of an activity queue 30a. When a previously consumed resource is not released, the lot which consumed it continues as use the resource for subsequent queues until plan 26 calls for releasing the resource. For example, the napkin is not released after queue 30a. Thus, the napkin continues to be associated with the lot during simulation, and the simulation recognizes that the napkin is not available for use by another lot.

After completion of process 28a, manufacturing flow in environment 10 is simulated as progressing into static wait queue 30s of process 28b. Process 28b operates similarly to process 28a, except that no dynamic wait queue 30d is included. The dynamic wait queue may be omitted because the dynamic resource, labor user 22, has not been released and is still allocated to this lot. In addition, another static resource of a cone, as defined by the expert user 22, is consumed at a static wait queue 30s of process 28b. When the cone becomes available, manufacturing flow proceeds to activity queue 30a of process 28b. In activity queue 30a of process 28b, the labor user 22 picks up the cone.

After completion of this activity queue 30a, manufacturing flow proceeds to static wait queue 30s of process 28c. In this static wait queue, a static resource, as defined by the expert user 22, of a scoop of ice cream is consumed, and a static resource of a scooping implement is consumed. As discussed above, manufacturing flow progresses out of static wait queue 30s of process 28c and into activity queue 30a of process 28c only when these static resources become available. In this activity queue 30a, the labor user 22 actually scoops the ice cream and places the ice cream in the cone. According to plan 26, at the completion of this activity queue 30a, the scooping implement and labor user 22 are released. After release, the simulations of environment 10 reflect the allocation of these released resources to other lots.

With reference back to FIG. 1, coordinator 13 may receive messages related to associating resources 14 with new lots 16 from planner 24, through a vector agent 32. In addition, messages received by coordinator 13 may, for example, originate from users 22 through a movement controller 34 and/or a message processor portion of an execution controller 38 to update transaction screens, which pass information between coordinator 13 and users 22. Such transaction screens may request information related to identifying lots 16 which are awaiting labor services or inform coordinator 13 of changes in environment 10 to which coordinator 13 must respond.

Vector agent 32 operates with a vector manager 40 to specify, maintain, and otherwise control future resource commitments to lots. Vectors, vector agent 32, and vector manager 40 are described in more detail in the above-discussed "Means and Method for Managing Manufacturing or Other Resources" patent reference. Execution controller 38 simulates environment 10 based on information maintained by vector manager 40 and coordinator 13. On the basis of these simulations, plans, such as plan 26 and other plans, are cooperatively controlled in real time to optimize resource-lot allocations in environment 10. Execution controller 38 is described in more detail in the above-discussed patent reference entitled "Method of Controlling the Execution of Organizational Plans." Vector manager 40 initializes its internal knowledge with information provided by a manufacturing interpreter 42 and information about resources 14 provided through I/0 component 20. Manufacturing interpreter 42 translates data descriptive of a specific environment 10 to a generic form, which is compatible with the components of computer 18. The above-discussed "Process Flow Information Management System" reference provides additional information concerning manufacturing interpreter 42.

An alarm handling routine 44 provides a timing function for execution controller 38. This timing function instructs execution controller 38 to reassess simulations of environment 10 or to automatically cause specified ones of lots 16 to move based on the lot's plan 26 (see FIG. 2). An exception handling routine 46 evaluates deviations identified by execution controller 38 during simulations of environment 10 or by user 22 or another external source through I/0 component 20. The evaluation is customized for particular environments 10 by an expert user 22. After evaluation, a resolution of the deviation is returned to execution controller 38 for continued simulation and control of those lots 16 and resources 14 for which deviations were indicated. A resource relation manager 48 translates information concerning the configuration of resource sets and physical dependencies between resources. This information is translated between a form usable external to computer 18 and a form convenient for manufacturing interpreter 42 and movement controller 34.

The specific details of components 32-48 are not important to the present invention and are not discussed in detail herein. From the perspective of coordinator 13, messages are simply received from the other components of computer 18 and interpreted as commands to take specified actions. As discussed in more detail below, many of the specific commands and corresponding actions are subject to a wide degree of variation and to a wide degree of data communication configurations which are well known to those skilled in the art. However, a data structure for storing resource-lot association data, which is implemented within a memory portion 50 of coordinator 13, in conjunction with an assortment of tasks performed by a processor portion 52 of coordinator 13, permits coordinator 13 to associate lot information with resource information in a highly desirable format. In the preferred embodiment, controller or processor 52 directly couples to the other components of computer 18, and processor 52 couples to memory 50. Preferably, memory 50 is constructed from random access, read-write, semiconductor memory components so that data is transferred in to and out from memory 50 as rapidly as possible.

Figure 6:
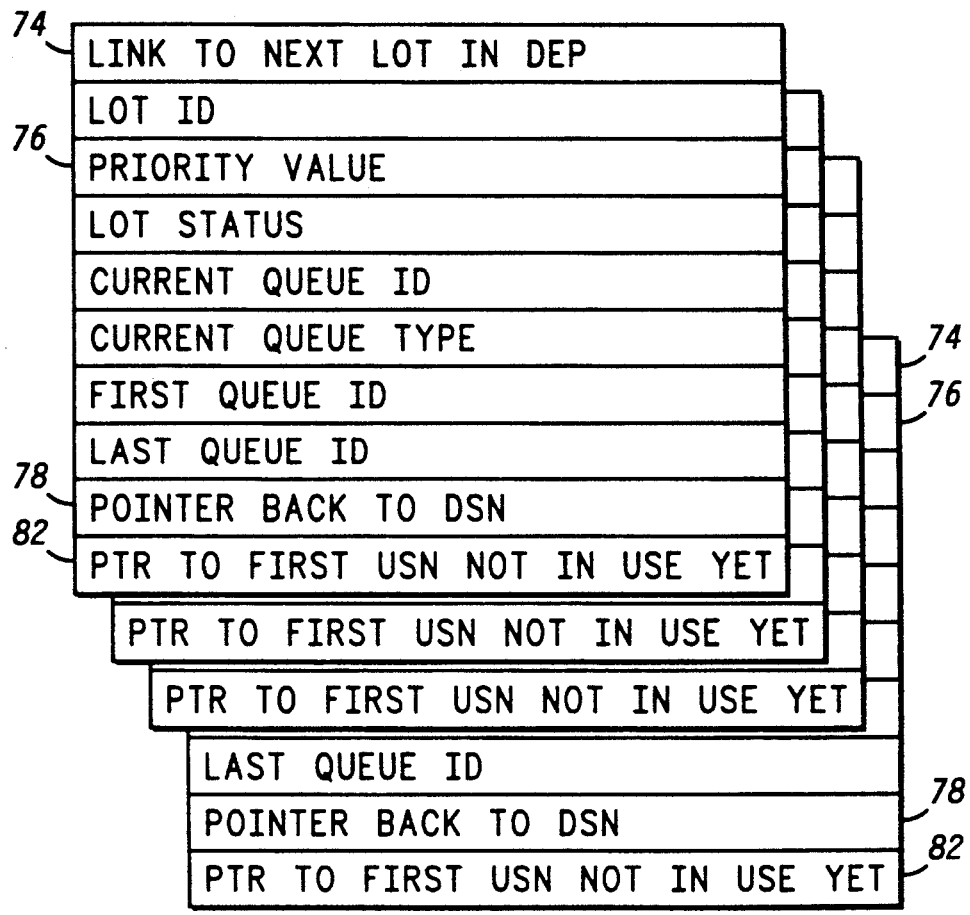
FIG. 6 illustrates exemplary Lot-Structure Nodes (LSNs) included within the memory portion of the coordinator of the present invention.
Figure 7:
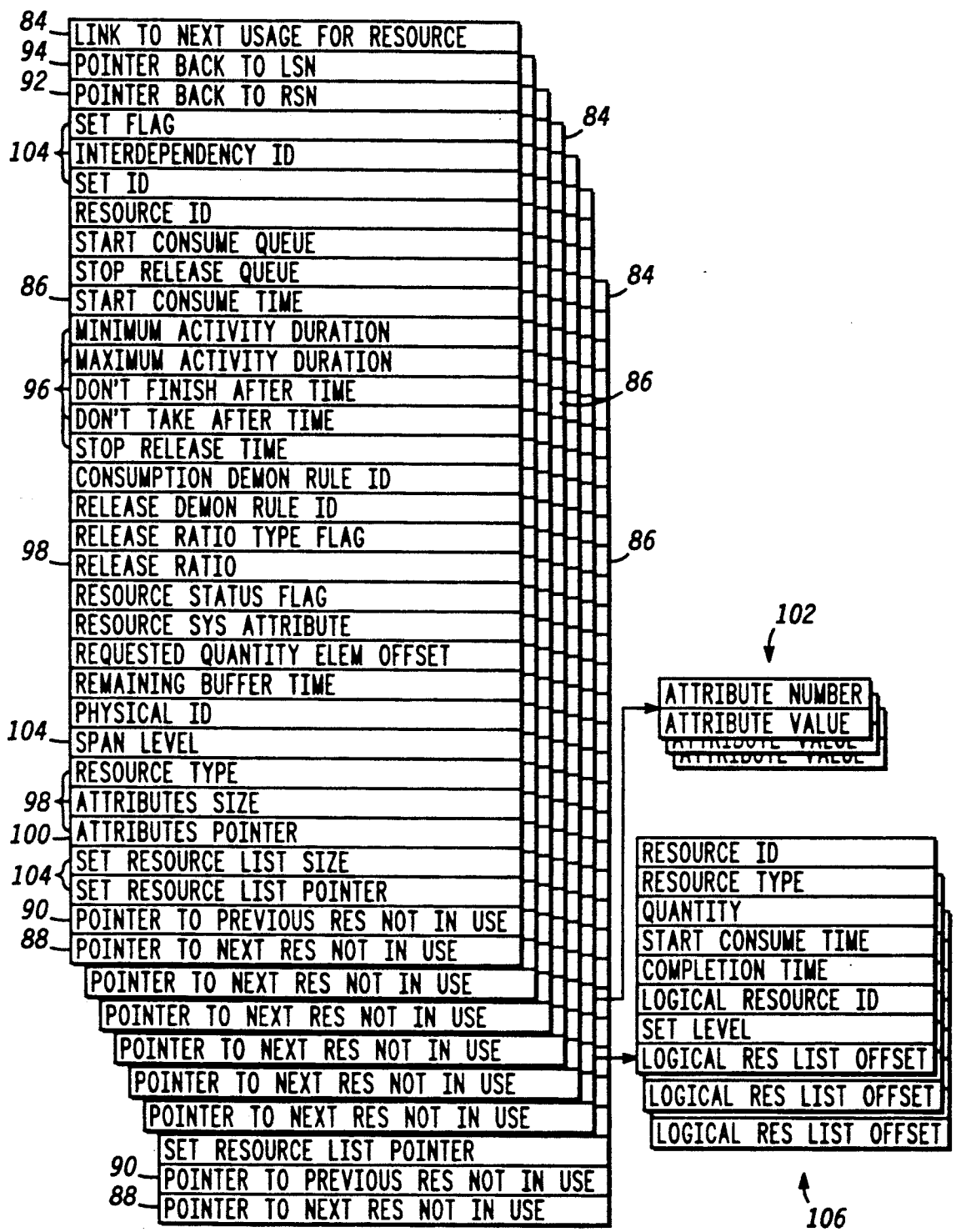
FIG. 7 illustrates an exemplary resource-Usage-by-lot-Structure Nodes (USNs) included within the memory portion of the coordinator of the present invention.
Figure 8:
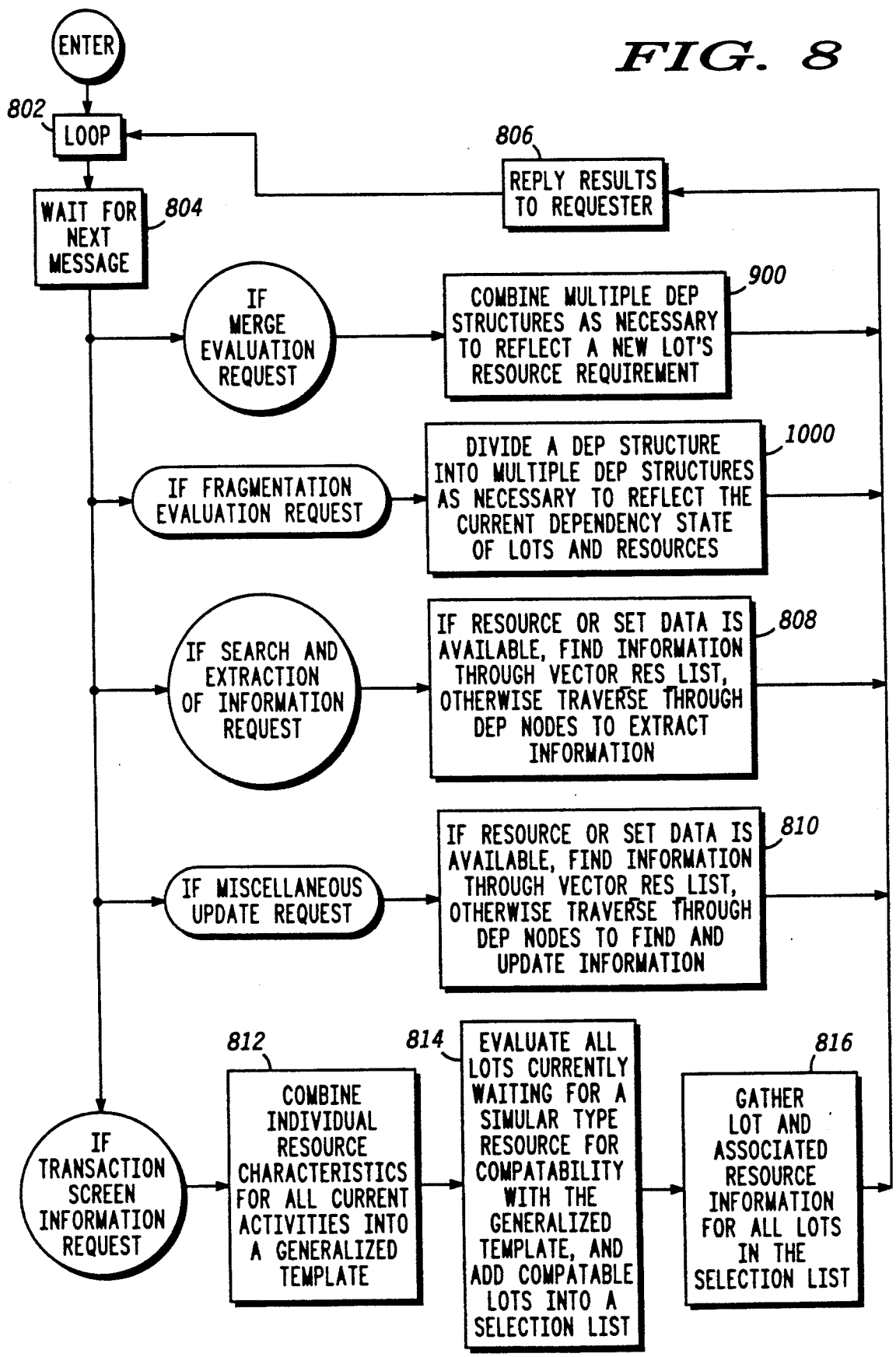
FIG. 8 shows a simplified flow chart of tasks performed by a controller portion of the coordinator of the present invention.
Figure 9:
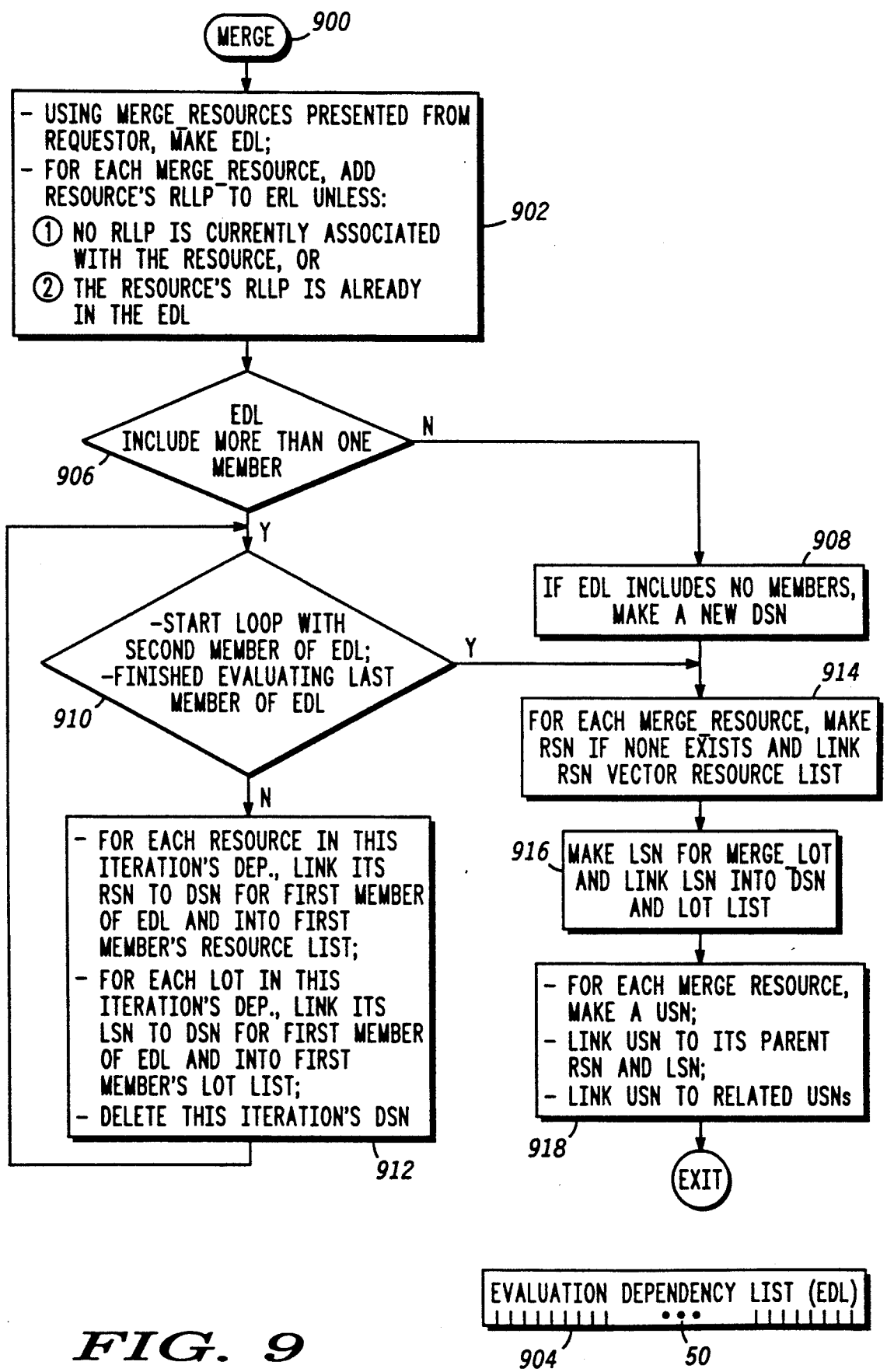
FIG. 9 shows a flow chart of tasks performed by a "Merge" process of the present invention.

FIGS. 3-7 present diagrams which depict a data architecture 54 formed within memory 50 of coordinator 13. The preferred embodiment includes two of architectures 54 within memory 50. One of these two architectures is associated with static resources (see TABLE I) and the other is associated with dynamic resources. Data communication received by coordinator 13 specifies whether to operate upon the static or dynamic architecture 54. However, for purposes of the present invention, architectures 54 are identical to one another, and the following discussion applies to both while referring to a single architecture 54. FIGS. 8-10 present flow charts which describe the tasks performed by processor 52 using architecture 54.

Figure 3:
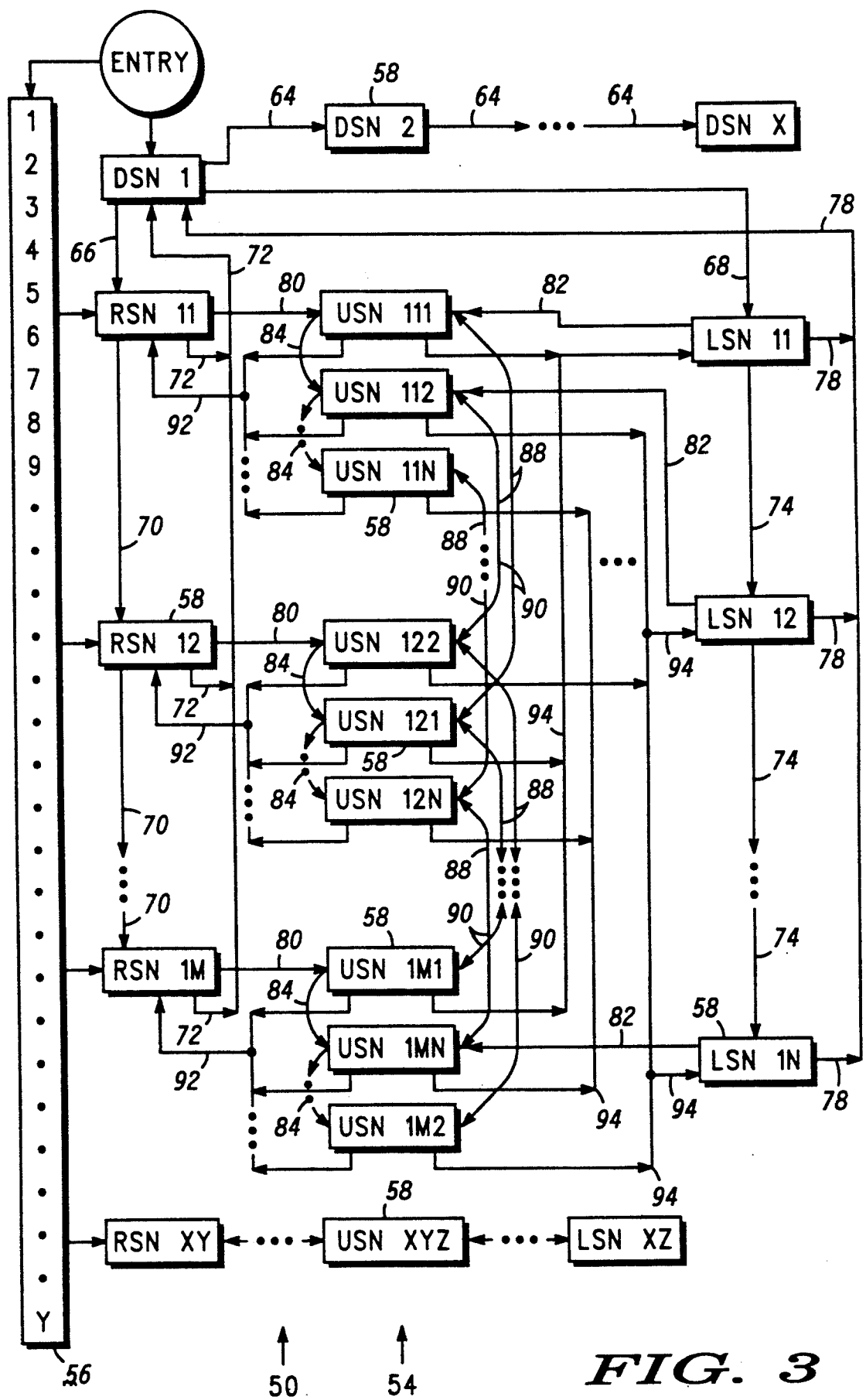
FIG. 3 presents a block diagram depicting relationships between various memory structure nodes included in a memory portion of the coordinator of the present invention.

Referring to FIG. 3, architecture 54 includes a vector resource list 56, which includes a data element for each resource 14 (see FIG. 1) in environment 10. As utilized herein, a "list" stores a collection of data elements which carry values that describe a common parameter of diverse items. For example, list 56 provides an ordered collection of pointer data elements. The diverse items related to list 56 are resource structure odes (hereinafter RSNs), which FIG. 3 illustrates as RSN 11, RSN 12, RSN IM, and RSN XY. The common parameter is a location or address parameter of memory 50 (see FIG. 1), and the values are the various addresses within memory 50 at which RSNs have been written. Accordingly, processor 52 (see FIG. 1) may access any RSN within architecture 54 through a conventional vectoring process, in which a resource \_id serves as an offset to list 56, and the pointer data element located at that offset gives the address within memory 50 of an RSN that is associated with the resource \_id.

Architecture 54 includes a multiplicity of nodes 58. As used herein, "nodes" store a collection of diverse types of data elements which together are treated as a single unit. However, various ones of nodes 58 are related to one another in an ordered fashion. The RSNs, discussed above, represent one type of node 58. FIG. 5 shows the various diverse types of data elements associated with RSNs. As discussed below, a list may also be formed by taking a single data element from various ones of nodes 58. For example, a resource \_id list is formed by taking a data element, or simply element, 60, shown in FIG. 5, from each RSN associated with a common dependency (see TABLE I).

In addition, coordinator 13 configures memory 50 so that nodes 58 include Dependency Structure Nodes (hereinafter DSNs), Lot Structure Nodes (hereinafter LSNs), and resource-Usage-by-lot Structure Nodes (hereinafter USNs). The preferred embodiment places no limitations on either the number of nodes 58 stored within memory 50 or on the quantity of elements included within any DSN, RSN, LSN, or USN. However, the organization of elements included in any one type of node 58, such as a DSN or USN, is consistent from node to node.

Generally speaking, DSNs reside at the top of a hierarchy formed by architecture 54. In other words, all resource-lot association information stored within memory 50 belongs within its own dependency (see TABLE I) and is related to only a single, unique DSN. While FIG. 3 shows DSNs 1, and 2-X, the preferred embodiment places no limitations on either the number of DSNs stored within memory 50 or on the quantity of elements included within a single DSN.

FIG. 4 shows various elements included within each DSN in the preferred embodiment. An element 62 included in each DSN provides a unique identifying code for a single dependency. Elements 64, 66, and 68 serve as pointers which link the DSN to other ones of nodes 58. Specifically, pointer element, or simply pointer, 64 links the DSN to another DSN, pointer 66 links the DSN to an RSN, and pointer 68 links the DSN to an LSN. As shown in FIGURE 3, pointers 64 form a dependency list in which each of pointers 64 links a DSN to a subsequent DSN so that all DSNs within architecture 54 are linked together. Consequently, processor 52 accesses a particular DSN, which is identified by its dependency identifier, or dep\_id, (element 62), through entering the dependency list at DSN 1, and traversing the dependency list in a known manner until the desired DSN is encountered. The order in which DSNs are linked together is not important in the preferred embodiment.

Pointer 66 identifies RSN 11. The first "1" in referring to RSN 11 indicates that RSN 11 is associated with DSN 1, and the second "1" indicates that RSN 11 is the first RSN in a resource list associated with DSN 1. Similarly, RSNs 12 and IM correspond to the 2nd and Mth RSN in this resource list, and RSN XY represents the Yth RSN in a resource list associated with DSN X. For clarity, FIGURE shows only a resource list associated with DSN 1. However, each DSN in architecture 54 has its own resource list. As shown in FIG. 5, each RSN includes a pointer 70 which links the RSN to a subsequent RSN in a linked list similar the above-described dependency list. RSN XY is not linked to any RSN associated with DSN 1 because RSN XY is associated with DSN X. The particular order in which RSNs are linked together through pointers 66 and 70 is not important in the preferred embodiment because processor 52 may rapidly access any RSN through list 56. Although access to a specific RSN through list 56 using a resource \_id is preferred, RSNs may also be accessed by using a dep_id (see element 62 of FIG. 4) to identify a specific resource list, and traversing that resource list until a desired RSN is encountered.

A pointer 72 (see FIGS. 3 and 5) included within each RSN links the RSN back to its DSN. Accordingly, when processor 52 has accessed an RSN through list 56 or otherwise, it can quickly identify with which dependency the RSN is associated.

Pointer 68 identifies LSN 11. As discussed above in connection with RSNs, the first "1" in referring to LSN 11 indicates that LSN 11 is associated with DSN 1, and the second "1" indicates that LSN 11 is the first LSN in a lot list associated with DSN 1. Similarly, LSNs 12 and 1N correspond to the 2nd and Nth LSN in this dependency's lot list, and LSN XZ represents the Zth LSN in a lot list associated with DSN X. For clarity, FIG. 3 shows only a lot list associated with DSN 1. However, each DSN in architecture 54 has its own lot list.

As shown in FIGS. 3 and 6, each LSN includes a pointer 74 which links the LSN to a subsequent LSN in a linked list similar the above-described dependency list. LSN XZ is not linked to any LSN associated with DSN 1 because LSN XZ is associated with DSN X. Unlike RSNs discussed above, processor 52 links LSNs together in a particular, order Specifically, LSNs are linked together in a priority order, determined by values carried in elements 76, included in the LSNs. Processor 52 may access LSNs using a dep_id (see element 62 of FIG. 4) to identify a specific lot list, and traversing that lot list until a desired LSN is encountered. By ranking LSNs in priority order, this traversing encounters LSNs associated with higher priority lots before it encounters LSNs associated with lower priority lots. Since more processing activity takes place with respect to higher priority lots, overall access time improves.

A pointer 78 included within each LSN links the LSN back to its DSN. Accordingly, when processor 52 has accessed an LSN, it can quickly identify with which dependency the LSN is associated.

As shown in FIGS. 5-6, RSNs and LSNs, respectively, may include certain elements which directly relate to resource-lot associations. For example, status and queue elements included within LSNs (see FIG. 6) reflect a lot's current status, such as active, expedited, or frozen, and information related to queues identified in the lot's plan. However, for the most part specific resource-lot association data is included within a USN. Architecture 54 includes one RSN for each resource 14 used or projected for use in environment 10 (see FIG. 1) and one LSN for each lot 16 within environment 10. On the other hand, architecture 54 includes one USN for each current and projected use of a resource by a lot. Consequently, each USN is related to both an LSN and an RSN, and the number of USNs within architecture 54 is at least as great as the number of RSNs times the number of LSNs.

Processor 52 may access a specific USN by first accessing either an RSN or an LSN as described above. Preferably, processor 52 uses the quickest path, which is through list 56 and an RSN (see FIG. 3) when processor 52 has received a resource_id from a requesting entity. Each RSN includes a pointer 80 which identifies a USN (see FIG. 5) and each LSN includes a pointer 82, which also identifies a USN (see FIG. 6). The preferred embodiment does not require pointers 80-82 to identify the same USN.

FIG. 3 refers to USNs using a three-digit nomenclature. The first digit identifies the DSN with which the USN is associated. The second or middle digit identifies the RSN with which the USN is associated, and the third or last digit identifies the LSN with which the USN is associated. Thus, USN 111 is associated with DSN 1, RSN 11, and LSN 11. Similarly, USN 112 is associated with DSN 1, RSN 11, and LSN 12, and USN XYZ is associated with DSN X, RSN XY, and LSN XZ.

The USNs identified by pointers 80 are associated with the oldest usages of resources 14 (see FIG. 1) by various ones of lots 16. FIG. 3 identifies these USNs as USNs 111, 122, and IMI for RSNs 11, 12, and IM, respectively. Moreover, the usages of the resources indicated by USNs 111, 122, and IM1 may represent actual currently-underway usages and not merely projected usages. As shown in FIGURE 7, each USN includes a pointer 84 which links the USN to another USN. Pointer 84 identifies a USN which describes the next usage of the corresponding resource. Typically, but not necessarily, this next usage will be by a different lot. Accordingly, pointers 84 link USNs together in a resource-usage list. For RSN 11, pointers 84 link USN 111 to USN 112, and link USN 112 to USN 11N. For RSN 12, pointers 84 link USN 122 to USN 121, and link USN 121 to USN 12N. Likewise, for RSN IM, pointers 84 link USN IMI to USN IMN, and link USN IMN to USN 1M2. USN XYZ is not linked in any of the USNs associated with DSN 1 because it is associated with DSN X.

In the preferred embodiment, processor 52 links resource-usage lists together in usage order. Each USN includes an element 86 (see FIG. 7) which processor 52 reads in linking the USNs together. Element 86 is supplied from entities external to coordinator 13 (see FIG. 1) and identifies points in time when the resource usage begins or is projected to begin. Thus, pointers 84 link USNs together in order of increasing values carried by elements 86.

The USNs identified by pointers 82 (see FIGS. 3 and 6) are associated with upcoming usages, as opposed to actual or current usages, of various ones of resources 14 (see FIG. 1) by the corresponding lots. In FIG. 3, these USNs are identified as USNs 111, 112, and IMN for LSNs 11, 12, and IN, respectively. Moreover, the usages of the resources indicated by USNs 111, 112, and IMN are the next resource usages to be initiated by the corresponding lots. As shown in FIG. 7, each USN includes a pointer 88 and a pointer 90, both of which link the USN to another USN. Pointer 88 identifies a USN which describes the next resource usage by the corresponding lot. Typically, but not necessarily, this next usage will be of a different resource. Pointer 90 identifies a USN which describes the immediately previous resource usage by the corresponding lot. Accordingly, pointers 88-90 together link USNs in a double-linked, forward and rearward progressing, lot-usage list. For LSN 11, pointers 88 and 90 link USNs 111 and 121 together, and link USNs 121 and 1Ml together. For LSN 12, pointers 88-90 together link USNs 112 and 122 together, and link USNs 122 and 1M2 together. Likewise, for LSN 1N, pointers 88-90 link USNs IMN and 12N together, and link USNs 12N and 11N together.

In the preferred embodiment, processor 52 links lot-usage lists together in resource usage order for each corresponding lot. Processor 52 reads the above discussed element 86, which is included in each USN (see FIG. 7), in linking the USNs together.

As shown in FIGS. 3 and 7, each USN also includes pointers 92 and 94. Pointer 92 identifies the RSN with which the USN is associated. Thus, within each of USNs 111, 112, and 11N, pointer 92 identifies RSN 11. Likewise, within each of USNs 122, 121, and 12N, pointer 92 identifies RSN 12, and within each of USNs 1M1, 1MN, and 1M2, pointer 92 identifies RSN 1M. Pointer 94 identifies the LSN with which the USN is associated. Thus, within each of USNs 111, 121, and 1M1, pointer 94 identifies LSN 11. Similarly, within each of USNs 112, 122, and 1M2, pointer 94 identifies LSN 12, and within each of USNs IIN, N, and 1MN, pointer 94 identifies LSN 1N.

As shown in FIG. 7, the remaining data elements included in each of the USNs carry values which, among other things, describe timing relative to when its resource is expected to be used, characteristics required of its resource during it's usage, and dependencies between various resources. Element 86, discussed above represents one timing data element, but additional timing elements 96 provide a wide array of additional timing data that describe a specific usage of a specific resource by a specific lot. Characteristic elements 98 carry values which describe various attributes or other characteristics of a specific lot's usage of a specific resource. Since the number of attributes associated with each usage may vary, each USN may include an attribute pointer 100 as one of characteristic elements 98. Pointer 100 identifies a variable length attribute list 102, which includes the relevant attribute data. Although FIG. 7 shows only one attribute list 102 for clarity, each USN may have an attribute list associated therewith.

Certain ones of resources 14 within environment 10 (see FIG. 1) may be used together as a set. For example, a baking dish resource and a oven rack resource may be required whenever an oven resource is used. A resource-dependency results, and such resources may be treated as a resource set. Such a resource-dependency is a direct dependency. In addition, resources may be indirectly dependent on one another. For example, the baking dish of the above-discussed example may represent only one of several baking dish resources available for use in connection with the oven resource. All baking dish resources would be indirectly dependent on one another when any one of the several baking dishes would satisfy a lot's demand for the resource. An association of a lot with a set of resources, whether direct or indirect, causes all resources within the set to share a dependency with the lot. However, when a resource from an indirect resource-dependency is consumed, the remaining indirectly dependent resources no longer share the dependency. Accordingly, resource-set elements 104, shown in FIGS. 5 and 7, carry values which identify and characterize these resource-dependencies. One of set elements 104 may represent a pointer which identifies a variable length dependency-resource list 106 that includes data descriptive of other resources in the set which has been allocated to a given lot.

Accordingly, as shown by FIGS. 1 and 3–7, memory 50 is configured so that architecture 54 allows processor 52 to quickly access items of data requested by the components of computer 18 which are external to coordinator 13. In addition, coordinator 13 coordinates these items of data to minimize the amount of data which these external components must process. For example, no resource-associated or lot-associated data are contained within the domain of more than one dependency. When actual or simulated resource-lot association changes occur or are projected, only those resources and lots which share a dependency with the resources and lots for which changes are occurring are presented for evaluation. This allows, for example, simulations performed by execution controller 38 to operate on less data than are included within the entire set of resources and lots within environment 10. As a result, simulations occur rapidly, and real time outputs are produced.

One frequent request of coordinator 13 is for information related to specific resources during simulations of environment 10. These requests present a resource _id which processor 52 can use as an offset through list 56 to quickly identify an RSN. From the identified RSN processor 52 can traverse linkages 80 and 84 until all requested information is found. In addition, USNs may be traversed in both resource-usage order or lot-usage order. These multiple paths permit processor 52 to rapidly detect requested data.

FIG. 8 shows a flow chart of tasks performed by processor 52 in coordinating resource-lot associations recorded in memory 50. Of course, those skilled in the art will recognize that the performance of these tasks may result from processor 52 executing programming instructions stored in a portion of memory 50 which is not included in architecture 54 (see FIG. 3). In addition, those skilled in the art will further recognize than any one of a wide variety of well known programming methodologies may be employed to implement such programming instructions.

The flow chart of FIG. 8 assumes that architecture 54 (see FIG. 3) is initialized before a loop 802 is entered. The preferred embodiment employs conventional initializing techniques, and such initialization is not discussed in detail herein. Within loop 802, processor 52 waits for an incoming message at a task 804. As discussed above in connection with FIG. 1, such messages may originate from various components within computer 18. The preferred embodiment employs conventional data communication techniques in encoding messages for receipt by coordinator 13.

When a message is received, task 804 evaluates the message to determine which subsequent actions to take. If task 804 detects a message instructing coordinator 13 to perform a "merge" operation, program control proceeds to a routine 900. A merge operation may be instigated, for example, by planner 24 (see FIG. 1). When planner 24 constructs a plan, such as plan 26 (see FIG. 2) for a lot, the lot has merely been planned and does not yet represent work-in-progress within environment 10 (see FIG. 1). The process of starting a planned lot as work-in-progress begins with merging the resource-lot associations of a plan 26 into the currently existing resource-lot associations of architecture 54 (see FIG. 3). The merge message includes a lot identifier (lot _id) uniquely identifying the new lot to be merged, resource _ids for all of the resources identified in plan 26, and timing data describing usages of the resources by the new lot.

Generally speaking, routine 900 evaluates dependency associations for the lots and resources identified in the merged data. FIG. 9 presents a flow chart that depicts routine 900. With reference to FIGS. 9 and 3, upon entering routine 900, a task 902 makes an Evaluation Dependency List (EDL) 904. EDL 904 is a data structure maintained within memory 50 apart from architecture 54. Task 904 evaluates each resource_id having a corresponding RSN, its dep_id (see element 62, FIG. 4) is placed in EDL 904. Task 902 uses list 56 and linkages 72 to quickly obtain dep_ids. In addition, task 902 refrains from adding dep_ids to EDL 904 whenever a merging resource is not then-currently associated with a dependency or when a merging resource's dep_id is already in EDL 904.

After task 902, a task 906 determines the number of dep_ids within EDL 904. If EDL 904 holds less than two dep_ids, then the dependencies which need to be combined as a result of the merger have already been isolated. When EDL 904 holds only one member, the new lot and related resources are combined with that one existing dependency. When EDL 904 includes no members, then the merging lot and merging resources form their own new dependency which need not be combined with other dependencies, as shown in task 908.

On the other hand, if task 906 detects that EDL 904 contains two or more dep_id members, then a task 910 acts as the control point of a loop which evaluates all members of EDL 904, starting with the second member. Each dep_id identifies a DSN. Within this loop, a task 912 investigates each RSN associated with the loop iteration's DSN. Pointers 72 for each RSN are adjusted to identify the first DSN member of EDL 904, and pointer 70 of the last member of the first DSN's resource list is modified to link to the first RSN associated with the loop iteration's DSN.

Similarly, task 912 investigates each LSN associated with the loop iteration's DSN. Pointers 78 for each LSN are adjusted to identify the first DSN member of EDL 904, and pointers 74 of the members of the first DSN's lot list are modified to link in, in priority order, the LSNs associated with the loop iteration's DSN. After all RSNs and LSNs for the iteration's DSN have been associated with the first DSN member of EDL 904, the iteration's DSN is deleted from architecture 54. No changes to USNs take place here.

After task 912, program flow proceeds back to task 910 to combine any subsequent DSNs in EDL 904 with the DSN of the first member. When the loop has finished, program flow proceeds to task 914, which is also performed after task 908, discussed above. At task 914, a single DSN has been identified to accommodate the merge activity. Task 914 makes new RSNs for any merging resources which did not previously have an RSN within architecture 54. Task 914 also links these new RSNs into the existing resource list for this single DSN, through pointers 70-72, and links the new RSNs to vector resource list 56.

Next, a task 916 performs a similar process with the new merging lot. Specifically, task 916 makes a new LSN corresponding to the merging lot and links the new LSN to its DSN through pointers 74 and 78. As discussed above, LSNs are linked in priority order. Thus, in task 916 processor 52 examines elements 76 (see FIG. 6) of the new LSN and of existing LSNs to determine the point in the DSN's lot list where the new LSN is linked.

After task 916, a task 918 makes a USN for each merging resource. All of the new USNs indicate usage by the new lot. Pointers 82, 88, 90, and 94 are set to form the lot-usage list with the new LSN made above in task 916. In addition, pointers 80, 84, and 92 for these new USNs are set to appropriately link each new USN to its associated RSN. As discussed above, the lot-usage lists and resource-usage lists formed within USNs are linked in usage order. Accordingly, processor 52 examines elements 86 (see FIGURE 7) of each USN to determine the points in the resource and lot-usage lists where the new USN is to be linked. Finally, EDL 904 is discarded.

After task 918, program control exits routine 900 and proceeds to a task 806 (see FIG. 8). During task 806, processor 52 responds to the entity that sent the message, in this case a merge message, to coordinator 13. For a merge message, the response returns a data communication which indicates that the merge has been completed. After task 806, program control returns to task 804, discussed above.

Wait task 804 may also detect an "evaluate fragmentation," or "frag", message. The frag message may, for example, originate from the movement controller 34 or execution controller 38. Typically, when a lot moves to the next queue in its plan, resources may be consumed and released. As discussed above, the release of resources may alter dependencies. For example, two lots may share a dependency due only to a common projected use of a single resource. After the single resource has been used by one of the lots and released, the lots no longer share a dependency. When task 804 encounters a frag message, program control proceeds to a routine 1000, which is discussed in more detail in FIG. 10. The frag message includes a dep_id which identifies a dependency which may be fragmented. In general, routine 1000 investigates the dependency structure with which the frag lot is associated to determine whether the dependency structure may be broken into multiple dependencies. In addition, routine 1000 performs the tasks needed to break a single dependency into multiple dependencies.

With reference to FIGS. 3 and 10, processor 52 initially performs a task 1002 within routine 1000. Task 1002 accesses architecture 54 to make a Fragment Lot List (FLL) 1004 that identifies all lots associated with the dep_id received with the frag message. FLL 1004 and lists 1010, 1016, and 1018, discussed below, are data structures maintained within memory 50 apart from architecture 54. Processor 52 may traverse the dependency list formed through pointers 64 until the specified dep_id is located (see element 62 in FIG. 4), then traverse the lot list formed through pointers 68 and 74 for the specified DSN to complete FLL 1004.

After task 1002, a task 1006 inquires whether the number of lots identified in FLL 1004 is greater than one. If only one lot is currently associated with the specified dependency, architecture 54 indicates that no other lots share a dependency with the specified lot. Accordingly, no other lots exist from which the specified lot may be fragmented, and no fragmentation can occur. In this situation, program control exits routine 1000.

On the other hand, when task 1006 determines that FLL 1004 includes multiple members, a task 1008 removes one member from FLL 1004 and places this member in a Evaluation Lot List (ELL) 1010. Accordingly, at this point within routine 1000, ELL 1010 includes one member that identifies a single lot associated with the DSN which is being investigated for fragmentation. After task 1008, a task 1012 operates as a control point for a loop which investigates all lots identified by ELL 1010. At the first iteration of this loop, ELL 1010 includes only one lot. However, this and subsequent iterations may expand the number of lots identified by ELL 1010.

Within this loop, a task 1014 makes an Evaluation Resource List (ERL) 1016. ERL 1016 identifies all resources projected for future use by this iteration's lot. ELL 1010 immediately identifies the LSN corresponding to this iteration's lot. Pointers 82 and 88 form a lot-usage list of USNs. As discussed above, each USN within this lot-usage list includes data elements, such as pointer 92, which identify the resources used by the subject lot. Task 1014 copies these identifiers to ERL 1016. However, task 1014 first compares the resource identifier against entries in a Completed Resource List (CRL) 1018. CRL 1018 identifies those resources which have already been evaluated by routine 1000, and task 1014 omits including any resource within ERL 1016 which shows up in CRL 1018.

After task 1014, a task 1020 serves as a control point for a loop which evaluates the resources identified in ERL 16 one at a time. Within this loop, a task 1022 identifies all lots scheduled to use the loop iteration's resource. Processor 52 may perform this identification by traversing the resource-usage list of USNs through pointers 80 and 84. As discussed above, each USN identifies its corresponding lot through pointer 94. The identified lots are removed from FLL 1004 and added to ELL 1010. In addition, before proceeding back to task 1020 to perform another iteration of this resource loop, task 1022 adds this iteration's resource to CRL 1018. This resource loop continues until all resources in ERL 1016 have been evaluated. At the end of this resource loop, ERL 1016 is discarded and program flow proceeds back to task 1012 to perform another iteration of the lot loop, which evaluates lots listed in ELL 1010.

When routine 1000 eventually evaluates all lots listed in ELL 1010, program control proceeds from task 1012 to a task 1024. At this point in routine 1000, ELL 1010 identifies all lots which share a dependency. Task 1024 inquires whether FLL 1004 is now empty. When FLL 1004 is empty, the shared dependency discovered through performing tasks 1008-1022 is the same dependency which architecture 54 currently records. Accordingly, program control simply exits routine 1000 without making any further changes.

On the other hand, when FLL 1004 continues to include lot-identifying data, such identified lots do not share a dependency with the lots identified at this point within ELL 1010. Consequently, a task 1026 creates a new DSN for the lots listed in ELL 1010. The resources included in CRL 1018 are also included in the new dependency. In creating this new DSN, all affected LSNs, RSNs, and USNs are relinked by manipulating pointers using above-discussed techniques. After the new DSN is created and new linkages formed, task 1026 erases lists 1010, 1016, and 1018 and program flow proceeds back to task 1006 to evaluate any remaining lots identified in FLL 1004. Eventually, one of tasks 1006 and 1024 will detect a condition for which no new dependencies can be created. At this point, program flow exits routine 1000 and proceeds to task 806 (see FIG. 8) to send a fragmentation complete acknowledgement to the entity which requested a fragmentation evaluation.

If task 804, discussed above, encounters an "extract" message, then program control transfers to a task 808. Execution controller 38 (see FIG. 1) is one common source for originating such extract messages. Moreover, such messages are frequently received when execution controller 38 simulates environment 10. Generally speaking, extract messages represent a family of messages which pass dependency, resource, lot, or usage identifying data to coordinator 13 for use in identifying information requested by the message. The requested information may be lot status, USN timing or attribute data, or any other item of data included in architecture 54. Conventional data communication encoding and decoding techniques are used to request specific items of data. In task 808, processor 52 extracts the requested information from architecture 54 and task 806, discussed above, returns the requested information to the requesting entity. If a resource_id is passed, then task 808 may utilize vector resource list 56 to access a specific RSN. Otherwise, a dep_id identifies a specified dependency. Task 808 then traverses RSN, LSN, and USN nodes as required by the specific message to obtain requested data.

If task 804 encounters a "miscellaneous update" message, program control proceeds to a task 810. The miscellaneous update message is generally initiated by execution controller 38 or exception handler 46 (see FIG. 1). Task 810 isolates a particular lot or resource data structure that requires modification and updates that information as required in the message. Task 810 allows lot and resource data to be deleted or otherwise changed significantly. However, since this routine does not evaluate the effect of the modifications relative to dependency structures, the requestor is required to independently request subsequent appropriate evaluations. After task 810, program control proceeds to task 806 to return an acknowledgement to the requesting entity.

If task 804 encounters a "transaction screen" request, then program control proceeds to tasks 812, 814, and 816. Tasks 812-816 support the dispatching of lot-associated work assignments to users 22 or resources 14 (see FIG. 1) in environment 10. Based on a request to find available lots waiting for a resource with compatible attributes, the evaluated resource is characterized by task 812. Using the set of current characteristics of the requested resource, task 814 compares all projected usage requirements for the lots currently waiting on a similar resource for compatibility. Next, task 816 tabulates all of these compatible lots with their associated resources, and task 806 then sends this information back to the requesting entity.

In summary, the present invention provides an improved apparatus and method for coordinating resource-lot associations. In particular, the present invention efficiently stores, maintains, and retrieves resource-lot association data. The use of dependency structures in describing resource-lot associations limits the quantity of data that must be processed by resource-lot allocation schemes which automate a manufacturing environment. These limits allow such schemes to process data related only to a portion of the entire manufacturing environment when individual manufacturing environment events are evaluated. Consequently, organization-wide simulations may take place in real time. The present invention includes a controlling agent or processor which is programmed to maintain the maximum possible number of such dependencies through the execution of merge and evaluate fragmentation routines. Thus, these portions of the entire manufacturing environment are kept as small as possible to minimize processing time. In addition, the present invention uses a memory architecture which occupies a relatively small amount of memory space and permits rapid access to specific resource-lot association data.

The present invention has been described above with reference to a preferred embodiment. However, those skilled in the art will recognize that changes and modifications may be made in this preferred embodiment without departing from the scope of the present invention. For example, the above-described coordinator may additionally include devices and processes for backing up its memory. In addition, single linked lists could easily be formed into doubly linked lists, and the specific data elements included within the various above-described nodes may be altered to accommodate specific resource-lot allocation schemes. These and other changes and modifications which are obvious to those skilled in the art are intended to be included within the scope of the present invention.

What is claimed is:

1. A method for efficiently coordinating the association of a plurality of resources with a plurality of lots, said method comprising the steps of:
   providing a plurality of lots which comprise articles of manufacture;
   providing a plurality of resources which comprise a process and the relates assets for fabricating said articles of manufacture;
   first identifying lots selected from said plurality of lots and a plurality of individual resources selected from said plurality of resources which share a first single dependency;
   associating said lots and resources identified in said first identifying step with a first dependency-structure node (DSN) DSN;
   second identifying a plurality of individual lots selected from said plurality of lots and a plurality of individual resources selected from said plurality of resources which share a second single dependency, said first and second dependencies having no common lots and no common resources therebetween;
   associating said lots and resources identified in said second identifying step with a second DSN; and
   linking said first and second DSNs together; and
   coordinating the fabrication of said articles of manufacture in accordance with a plan derived from said linked DSNs.

2. A method as claimed in claim 1 additionally comprising the steps of:
   identifying and associating additional lots and additional resources with additional DSNs, said first, second, and additional DSNs being configures so that no common lot-identifying data and no common resource-identifying data are shared by any two of said DSNs; and
   adjusting the number of said DSNs to achieve a maximum possible number of said DSNs.

3. A method as claimed in claim 2 wherein said adjusting step comprises the steps of:
   receiving a message instructing the association of a new lot with specified resources;
   classifying each of said DSNs which have an individual merging DSN selected from said plurality of merging DSNs, linking resource-structure nodes (RSNs) an RSN associated with said merging DSN into a resource list associated with said first individual merging DSN selected from said plurality of merging DSNs;
   for each of said specified resources, creating a resource-usage-by-lot-structure node (USN) USN which includes data descriptive of a use of said specified resource by said new lot; and
   linking said USNs into a usage list.

4. A method as claimed in claim 3 wherein, for each of said merging DSNs except for said first individual merging DSN selected from said plurality of merging DSNs, said method additionally comprises the step of linking said RSNs associated with said merging DSN to said first individual merging DSN selected from said plurality of merging DSNs.

5. A method as claimed in claim 3 wherein, for each of said merging DSNs except for said first individual merging DSN selected from said plurality of merging DSNs, said method additionally comprises the step of linking lot-structure nodes (LSNs) associated with said merging DSN into a list of lots associated with said first individual merging DSN selected from said plurality of merging DSNs.

6. A method as claimed in claim 3 wherein, for each of said merging DSNs except for said first individual merging DSN selected from said plurality of merging DSNs, said method additionally comprises the step of erasing said merging DSN.

7. A method as claimed in claim 2 wherein said adjusting step comprises the steps of:
   receiving a message instructing the evaluation of a specified lot for disassociation from its DSN;
   identifying all of said lots which are associated with said specified lot in individual merging DSN selected from said plurality of DSNs so that a list of lots results;
   expanding said list of lots to include additional lots which share a dependency with any of said lots identified in said identifying step; and
   associating said lots represented in said list of lots with a new DSN.

8. A method as claimed in claim 7 wherein said expanding step comprises the steps of:
   determining all of said resources projected for use by individual lot selected from said plurality of lots identified in said list of lots so that a list of resources results;
   for each resource included in said list of resources, detecting all of said lots which use said resource;
   adding all lots detected in said detecting step to said list of lots; and
   repeating said determining, detecting and adding steps until all lots included in said list of lots have been evaluated.

9. A method as claimed in claim 1 wherein, for each of said DSNs, said method comprises the steps of:
   linking said DSN to a first resource-structure node (RSN), said first RSN including data descriptive of a first individual resource selected from said plurality of resources in said single dependency; and
   linking said DSN to a first lot-structure node (LSN), said first LSN including data descriptive of a first individual lot selected from said plurality of lots in said single dependency.

10. A method as claimed in claim 9 additionally comprising the steps of:
    linking said first RSN to a second RSN, said second RSN including data descriptive of a second individual lot selected from said plurality of resources in said single dependency; and
    linking said first LSN to a second LSN, said second LSN including data descriptive of a second individual lot selected from said plurality of lots in said single dependency.

11. A method as claimed in claim 10 wherein, for each of said RSNs, said method comprises the step of linking said RSN to a first resource-usage-by-lot-structure node (USN), said first USN including data descriptive of a use of the resource which corresponds to said RSN by a first individual lot selected from said plurality of lots.

12. A method as claimed in claim 11 wherein said linking said RSN to a first USN step comprises the step of detecting a USN which is associated with said resource and is currently being used by said first individual lot selected from said plurality of lots.

13. A method as claimed in claim 11 wherein said method additionally comprises the step of linking said first USN to a second USN, said second USN including data descriptive of a use, beginning no earlier than said use depicted by said first USN, of the resource which corresponds to said RSN by a second individual lot selected from said plurality of lots.

14. A method as claimed in claim 13 wherein said method additionally comprises the step of linking said first and second USNs to said RSN.

15. A method as claimed in claim 10 wherein:
said first individual lot selected from said plurality of said lots and said second individual lot selected from said plurality of said lots have their own priorities associated therewith; and
said linking steps are configured so that said first individual lot selected from said plurality of lots has a higher priority than said second individual lot selected from said plurality of lots.

16. A method as claimed in claim 10 wherein, for each of said LSNs, said method comprises the step of linking said LSN to a first resource-usage-by-lot-structure node (USN) memory-structure, said first USN including data descriptive of a use of individual resource selected from said plurality of resources by the lot which corresponds to said LSN.

17. A method as claimed in claim 16 wherein said method additionally comprises the step of identifying the next individual resource selected from said plurality of resources for which initiation of use is projected by the lot which corresponds to said LSN so that said first USN includes data descriptive of said next use.

18. A method as claimed in claim 17 additionally comprising the step of linking said first USN with a second USN, said second USN including data descriptive of a use, immediately subsequent to said next use depicted by said first USN, of a second individual resource selected from said plurality of resources by the lot which corresponds to said LSN.

19. A method as claimed in claim 18 additionally comprising the step of linking each of said first and second USNs to said LSN.

20. An apparatus comprising:
a plurality of lots comprising a plurality of articles requiring manufacture;
a plurality of resources for manufacturing said articles, in which a selected lot selected from said plurality of lots requires the use of selected resources selected from said plurality of resources and furthermore the efficient manufacture of said articles requires an association between said plurality of resources and said plurality of lots;
a first dependency-structure node (DSN) DSN in which data descriptive of said selected lot and a first portion of said selected resources are stored, said first DSN additionally including:
data descriptive of a first group of non-selected lots, each of which are required by members of said first group of non-selected lots;
a second DSN in which data descriptive of a second group of non-selected lots and of a second group of non-selected resources are stored, said first and second DSNs having no common lots or resources associated therewith; and
a pointer stored within a first individual lot selected from said plurality of first and second DSNs, for identifying a second individual lot selected from said plurality of first and second DSNs; and
a computer control system which coordinates the fabrication of said lots using said resources based on said association between lots and resources.

21. An apparatus as claimed in claim 20 wherein each of said resources is classified as being an individual static resource selected from said plurality of static resources; and wherein:
said first portion of said selected resources represents all of said selected resources which share a first individual static and dynamic classification selected from said plurality of static and dynamic classifications; and
said apparatus additionally comprises a third DSN in which data descriptive of said selected lot and a second portion of said selected resources are stored, said second portion of said selected resources representing all of said selected resources which share a second individual static and dynamic classification selected from said plurality of static and dynamic classifications.

22. An apparatus as claimed in claim 20 additionally comprising:
additional DSNs in which data identifying non-selected lots and non-selected resources which share additional common dependencies are stored, said first, second, and additional dSNs being configured so that no common lot-identifying data and no common resource-identifying data are shared by any two of said DSNs; and
control means, coupled to said first, second, and additional DSNs, for adjusting the number of said DSNs to achieve a maximum possible number of said structures.

23. An apparatus as claimed in claim 20 wherein, for each of said first and second DSNs, said DSN identifies a first lot-structure node (LSN) which includes:
data descriptive of a first individual lot selected from said plurality of lots represented in said DSN; and
a pointer that identifies a second LSN, said second LSN including data descriptive of a second individual lot selected from said plurality of lots represented in said DSN.

24. An apparatus as claimed in claim 20 wherein, in association with each of said first and second DSNs:
said apparatus additionally comprises first and second resource-structure nodes (RSNs);
said DSN identifies said first RSN;
said first RSN includes data description of a first individual resource selected from said plurality of resources represented in said DSN; and
said first RSN includes a pointer that identifies said second RSN, said second RSN including data descriptive of a second individual resource selected from said plurality of resources represented in said DSN.

25. An apparatus as claimed in claim 20 wherein each of said resources is classified as being an individual dynamic resource selected from said plurality of dynamic resources, and wherein:

said first portion of said selected resources represents all of said selected resources which share a first individual static and dynamic classification selected from said plurality of static and dynamic classifications; and said apparatus additionally comprises a third DSN in which data descriptive of said selected lot and a second portion of said selected resources are stored, said second portion of said selected resources representing all of said selected resources which share a second individual static and dynamic classification selected from said plurality of static and dynamic classifications.

26. An apparatus comprising:

a plurality of lots comprising a plurality of articles requiring fabrication;

a plurality of resources for fabricating said articles;

a computer system having a computer memory wherein the functioning of the computer system is determined by the structure of the computer memory;

a first dependency-structure node (DSN) DSN constructed using the computer memory such that data identifying an individual lot selected from said plurality of lots and an individual resource selected from said plurality of resources which share a first single dependency are stored within said first DSN;

a second DSN constructed using the computer memory in such a way that data identifying an individual lot selected from said plurality of lots and an individual resource selected from said plurality of resources which share a second single dependency are stored within said second DSN, said first and second DSNs having no common lot-identifying data and no common resource-identifying data therebetween; and a pointer word, stored within said first DSN, which identifies the location of said second DSN within the computer memory; and a control system which automatically controls allocation of lots and resources during fabrication of said articles using said resources in accordance with said first DSN, said second dSN and said pointer word.

27. An apparatus as claimed in claim 26 additionally comprising:

additional DSNs in which data identifying lots and resources sharing additional common dependencies are stored, said first, second, and additional DSNs being configured so that no common lot-identifying data and no common resource-identifying data are shared by any two of said DSNs; and control means, coupled to said first, second, and additional DSNs, for adjusting the number of said DSNs to achieve a maximum possible number of said DSNs.

28. An apparatus as claimed in claim 26 further comprising:

a first lot-structure node (LSN) constructed using the computer memory which includes;

data descriptive of a first individual lot selected from said plurality of lots in said first single dependency, and a pointer that identifies a second LSN, said second LSN including data descriptive of a second individual lot selected from said plurality of lots in said first single dependency; and said first DSN includes data which identify said first LSN.

29. An apparatus as claimed in claim 28 wherein:

each of said first and second LSNs includes data descriptive of a priority parameter associated therewith; and said first and second LSNs are linked together and to said first DSN in an order specified by said priority data.

30. An apparatus as claimed in claim 28 wherein:

said apparatus additionally comprises a first resource-usage-by-lot-structure node (USN);

said first LSN includes a pointer which identifies said first USN; and said first USN includes data descriptive of a use of individual lot selected from said plurality of resources by said first individual lot selected from said plurality of lots.

31. An apparatus as claimed in claim 30 wherein said LSN pointer is configured so that said identified first USN includes data descriptive of the first individual lot selected from said plurality of resources projected for use by said first individual lot selected from said plurality of lots.

32. An apparatus as claimed in claim 31 wherein:

said apparatus additionally comprises a second USN;

said first USN includes a pointer that identifies said second USN; and said second USN includes data descriptive of a use, immediately subsequent to said next use depicted by said first USN, of a second individual resource selected from said plurality of resources by said first individual lot selected from said plurality of lots.

33. An apparatus as claimed in claim 32 wherein said second USN includes a pointer that identifies said first USN.

34. An apparatus as claimed in claim 32 wherein each of said first and second USNs includes a pointer which identifies said first LSN.

35. An apparatus as claimed in claim 30 wherein said first USN includes:

data descriptive of timing associated with said use of said individual resource selected from said plurality of resources by said first individual lot selected from said plurality of lots; and data descriptive of characteristics of said individual resource selected from said plurality of resources required by said first individual lot selected from said plurality of lots.

36. An apparatus as claimed in claim 26 wherein:

said apparatus additionally comprises first and second resource-structure nodes (RSNs);

said first DSN identifies said first RSN;

said first RSN includes data descriptive of a first individual resource selected from said plurality of resources from said first single dependency; and said first RSN includes a pointer that identifies said second RSN, said second RSN including data descriptive of a second individual resource selected from said plurality of resources from said first single dependency.

37. An apparatus as claimed in claim 36 wherein said apparatus coordinates the association of a predetermined number of said resources with said lots, and each of said resources has its own unique resource identifier associated therewith, said apparatus additionally comprising:

additional rSNs, said additional RSNs being configured with said first and second RSNs so that individual RSN selected from said plurality of RSNs exists for each of said predetermined number of said resources; and an RSN list, wherein;

said list includes RSN pointers in a quantity equivalent to said predetermined number, each of said RSN pointers identifies its own individual RSN selected from said plurality of RSNs, and said RSN pointers are arranged in an order specified by said resource identifiers so that access to any individual RSN selected from said plurality from RSNs may occur through an offset from a beginning of said rSN list.

38. An apparatus as claimed in claim 36 wherein;

said apparatus additionally comprises a first resource-usage-by-lot-structure node (USN);

said first RSN includes a pointer which identifies said first USN; and said first USN includes data descriptive of a use of said first individual resource selected from said plurality of resources by individual lot selected from said plurality of lots.

39. An apparatus as claimed in claim 38 wherein:

said apparatus additionally comprises a second USN;

said first USN includes a pointer that identifies said second USN; and said second USN includes data descriptive of a use, beginning no earlier than said use depicted by said first USN, of said first individual resource selected from said plurality of resources by individual lot selected from said plurality of lots.

40. An apparatus as claimed in claim 39 wherein each of said first and second USNs includes a pointer which identifies said first RSN.

41. An apparatus as claimed in claim 38 wherein said first USN includes:

data descriptive of timing associated with said use of said first individual lot selected from said plurality of resources by individual lot selected from said plurality of lots;

data descriptive of said first individual resource selected from said plurality of resources required by said individual lot selected from said plurality of lots; and data descriptive of dependencies between said first individual lot selected from said plurality of resources and other individual resources selected from said plurality of resources.

* * * * *

UNITED STATES PATENT AND TRADEMARK OFFICE
CERTIFICATE OF CORRECTION

PATENT NO. : 5,295,065

DATED : March 15, 1994

INVENTOR(S) : William Chapman et al.

Page 1 of 2

It is certified that error appears in the above-indentified patent and that said Letters Patent is hereby corrected as shown below:

In column 21, line 23, claim 1, delete "identifying lots" and insert therefor --identifying a plurality of individual lots--.

In column 21, line 56, claim 3, delete "an individual" and insert therefor --an individual resource selected from said plurality of specified resources associated therewith as being a merging DSN; for each of said merging DSNs except to a first individual--.

In column 21, line 46, claim 2, delete "configures and insert therefor--configured--.

In column 22, line 44, claim 8, delete "detecting and" and insert therefor --detecting, and--.

In column 24, line 2, claim 20, delete "which are" and insert therefor --which require at least one of said first portion of said selected resources, and data descriptive of a first group of non-selected resources, each of which are--.

In column 24, line 19, claim 21, delete "resources;" and insert therefor --resources--.

In column 24, line 38, claim 22, delete "dSNs" and insert therefor --DSNs--.

In column 25, line 47, claim 26, delete "dSN" and insert therefor --DSN--.

In column 26, line 25, claim 31, delete "first" and insert therefor --next--.

In column 27, line 5, claim 37, delete "rSNs" and insert therefor --RSNs--.

UNITED STATES PATENT AND TRADEMARK OFFICE
CERTIFICATE OF CORRECTION

PATENT NO. : 5,295,065

DATED : March 15, 1994

INVENTOR(S) : William Chapman et al.

It is certified that error appears in the above-indentified patent and that said Letters Patent is hereby corrected as shown below:

In column 27, line 19, claim 37, delete "rSN" and insert therefor --RSN--.

Signed and Sealed this

Twenty-fourth Day of October, 1995

*Attest:*

BRUCE LEHMAN

*Attesting Officer*     *Commissioner of Patents and Trademarks*